United States Patent [19]

Newland

[11] Patent Number: 4,897,863

[45] Date of Patent: Jan. 30, 1990

[54] CORDLESS TELEPHONE ANTENNA ARRANGEMENT

[75] Inventor: Paul B. Newland, Middletown, N.J.

[73] Assignees: American Telephone and Telegraph Company, New York, N.Y.; AT&T Bell Laboratories, Murray Hill, N.J.

[21] Appl. No.: 234,701

[22] Filed: Aug. 22, 1988

[51] Int. Cl.[4] .......................... H04B 5/06; H01Q 1/00
[52] U.S. Cl. ...................................... 379/58; 343/720; 343/905
[58] Field of Search ....................... 343/702, 720, 905; 455/270; 379/61, 64, 58

[56] References Cited

U.S. PATENT DOCUMENTS

| | | | |
|---|---|---|---|
| 1,933,321 | 10/1933 | Emerson et al. | 455/270 |
| 2,218,830 | 10/1940 | Rose et al. | 343/720 |
| 2,915,627 | 12/1959 | Spindler | 455/270 |
| 3,290,601 | 12/1966 | Pinizzotto et al. | 455/270 |
| 3,803,366 | 4/1974 | Ishii et al. | 379/61 |
| 4,032,723 | 6/1977 | Mendoza | 179/61 |

OTHER PUBLICATIONS

"Secret Radio Aerials", Electrical Experimenter, Sep. 1917, pp. 300, 301, 342.

Primary Examiner—Rolf Hille
Assistant Examiner—Michael C. Wimer
Attorney, Agent, or Firm—Samuel R. Williamson

[57] ABSTRACT

An antenna arrangement for the base unit of a cordless telephone which consists of separate antennas for transmission and reception. A whip antenna is used for transmission, whereas the telephone Tip/Ring wiring is used for reception. The telephone Tip/Ring wiring operates as an antenna with a moderate distributed capacitance to ground. Radiation from the handset can be acquired almost anywhere along the house telephone wiring and can be then conducted to the cordless telephone base receiver by the same wire. Therefore, the telephone wiring serves dual purposes as an antenna and as a feedline. Because the transmitter and the receiver of the antenna arrangement are isolated, the receiver input filter is simple and easy to tune. The transmitting whip antenna is considerably smaller than the conventional whip antenna used for both transmission and reception, and its filters are also easier to tune than when used in a duplexer configuration.

3 Claims, 2 Drawing Sheets

CORDLESS TELEPHONE ANTENNA ARRANGEMENT

TECHNICAL FIELD

This invention relates to cordless telephones and more particularly to a cordless telephone antenna arrangement which utilizes separate antennas for transmission and reception in the base unit.

DESCRIPTION OF THE PRIOR ART

A typical cordless telephone includes a handset or remote unit and a base unit. The base unit is connected to a telephone line and includes an antenna, a transmitter and a receiver for communicating a radio frequency carrier signal that is modulated by switching signals and audio signals to and from the handset as appropriate. The handset unit includes an earphone and a microphone, and also an antenna, a transmitter and a receiver for likewise communicating telephone switching signals and audio signals to and from the base unit.

In the base unit of a typical cordless telephone, both the transmitter and the receiver are active at the same time, and one antenna is shared for transmission and reception. This is accomplished by means of a filtering system called a duplexer. A duplexer is used to ensure that proper filtering is provided between the transmitter and the antenna as well as between the receiver and the antenna. It also provides isolation between the transmitter and the receiver, so that the transmitter does not desensitize the receiver.

In order for the duplexer to provide good filtering characteristics, it requires a resonant circuit consisting of many LC(inductor/capacitor) filter sections. The turning of this complex circuitry is critical and often requires a skilled person to perform the task. In addition, the duplexer tuning often cannot be automated because it is difficult to achieve convergence with a simple program due to the large amount of interaction between the receiver and the transmitter ports of the duplexer.

Some communication systems in the known art use an alternating current(AC) power cord for signal transmitting or receiving purposes. Such systems include radio receivers and radio transmitters in the broadcast band. The AC wiring in the house, however, is not a good antenna because many signal shunting devices are connected between it and ground. Also, many of the devices connected to the AC house wiring create significant levels of electrical noise. On the contrary, the telephone wiring does not suffer from these problems because only telephone devices are connected to it; these devices, by design, do not shunt the telephone Tip/Ring wires to ground.

While the foregoing cordless telephone employing a duplexer has been generally satisfactory in the past, it is now technically feasible and desirable to provide a cordless telephone antenna arrangement that is simpler to tune and relatively inexpensive.

SUMMARY OF THE INVENTION

In accordance with the invention, there is provided an antenna arrangement for use in the base unit of a cordless telephone. The base unit is connectable to a telephone line for communicating with a central office. The antenna arrangement at the base unit utilizes separate antennas for radio frequency transmission and reception to and from the handset. The antenna used for transmitting radio frequency signals to the handset is the conventional, metallic, whip antenna, whereas the antenna used for receiving radio frequency signals from the handset is the telephone Tip/Ring house wiring. The telephone wiring therefore serves dual purposes as an antenna and as a feedline. Also, because the transmitter and the receiver of the antenna arrangement are isolated, the transmitter and receiver input filters are simple and easier to tune than when used in a duplexer configuration.

BRIEF DESCRIPTION OF THE DRAWING

The invention and its mode of operation will be more clearly understood from the following detailed description when read with the appended drawings in which.

DETAILED DESCRIPTION

Figure 1:
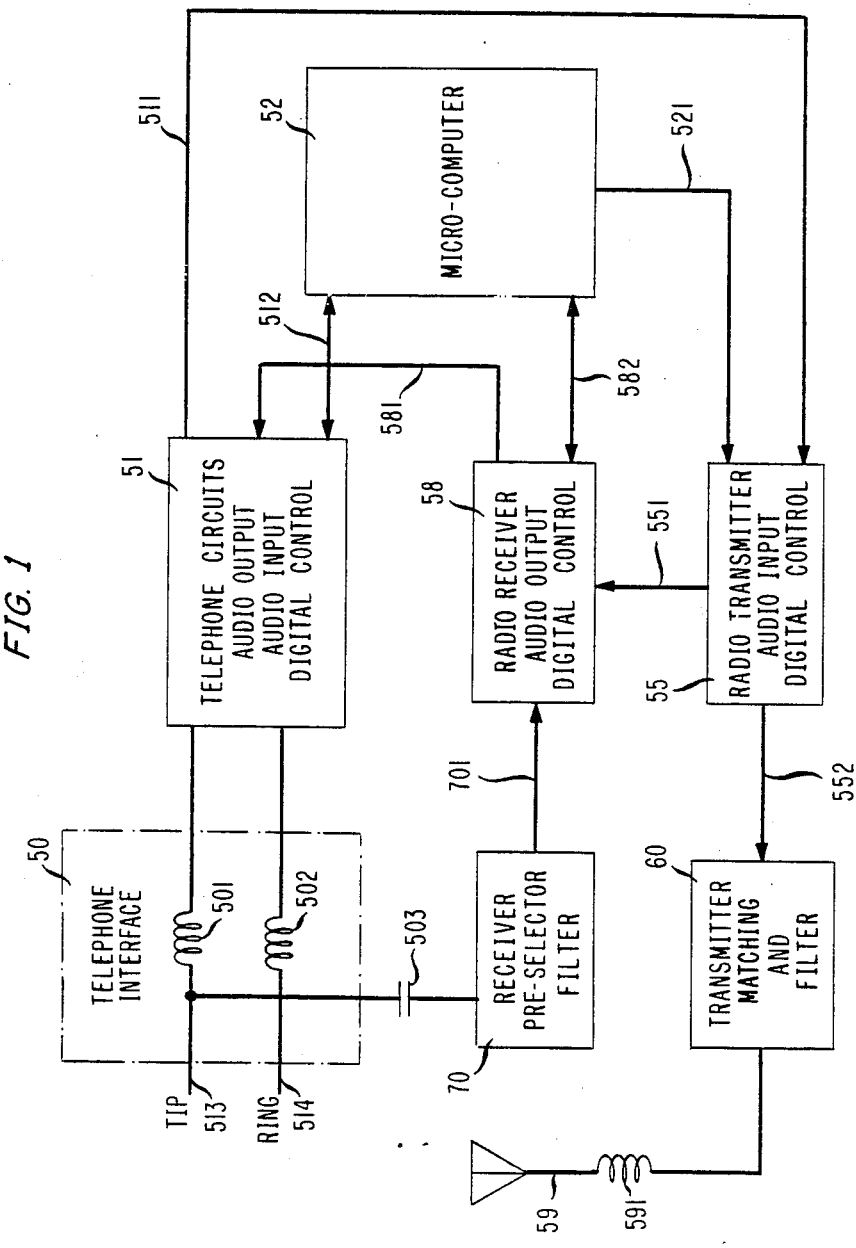
FIG. 1 is a functional block representation of an antenna arrangement in the base unit of a cordless telephone in accordance with the principles of the present invention.

FIG. 1 is a functional block representation of an antenna arrangement in the base unit of a cordless telephone in accordance with the principles of the present invention.

By way of general operation, the antenna arrangement at the base unit utilizes separate antennas for radio frequency transmission and reception to and from the handset. The antenna used for transmitting radio frequency signals to the handset is the conventional, metallic, whip antenna, whereas the antenna used for receiving radio frequency signals from the handset is the telephone Tip/Ring house wiring. This "wiring" consists of two major sections: the cord from the cordless telephone base until to the wall jack("cord") and the wiring from the wall jack to the telephone protector where the telephone wire leaves the house for the telephone pole. This "inside" wiring, from the wall jack to the protector, is usually contained within the walls of the house or, for existing structures, is stapled to the interior walls near the ceilling and/or floor.

The telephone "cord" and the "inside" wiring both act as a combination antenna and feedline structure. The "cord" has almost no shunt capacitance to ground while the "inside" wiring exhibits only a moderate distributed capacitance to ground. This lack of shunt capacitance to ground permits the telephone wire, unlike the AC power wires within the home, to be a good antenna and feedline of radio frequency signals.

With regard to a more specific description of the operation of the antenna arrangement, as shown in FIG. 1, the tip line 513 and ring line 514, which are connected to the telephone interface 50, provide a path for radio frequency(RF) and audio frequency signals. Located within the telephone interface 50 are two radio frequency chokes 501 and 502 that block the radio frequency signals and only allow the audio frequency signals to proceed to the telephone circuits 51. The tip line 513 and the ring line 514 are coupled to the receiver's pre-selector filter and impedance matching network 70. Only one capacitor is needed because of the interconductor capacitance between the tip line 513 and ring line 514. The capacitor 503 becomes a path for the RF signal to the receiver's pre-selector filter and impedance matching network 70 since the RF signal is blocked by the RF chokes 501 and 502. From the receiver's pre-selector filter and impedance matching network 70, the RF signal then enters the radio receiver 58 over line 701.

From the radio receiver 58, any received data contained within the RF signal is communicated to the microcomputer 52 over line 582. In turn, the microcomputer 52 passes any data to the telephone circuits 51 and to the radio transmitter 55 over lines 512 and 521 respectively. Similarly, any audio signal from the radio receiver 58 is passed to the telephone circuitry 51 over line 581 for coupling onto the tip line 513 and the ring line 514. Furthermore, the audio signal is passed to the radio transmitter 55 over line 511 from the tip line 513 and the ring line 514 through the telephone circuits 51.

The radio transmitter 55 and the radio receiver 58 are connected by line 551, which carries the signal of a local oscillator. This local oscillator is located in the radio transmitter and sends its signal from the radio transmitter to the the radio receiver to aid in demodulating the received RF signal. From the radio transmitter 55, the RF signal is fed into the transmitter's filtering and impedance matching network 60 over line 552. Finally, the RF signal is transmitted to a handset by an antenna 59 which includes a fixed loading coil 591.

Figure 2:
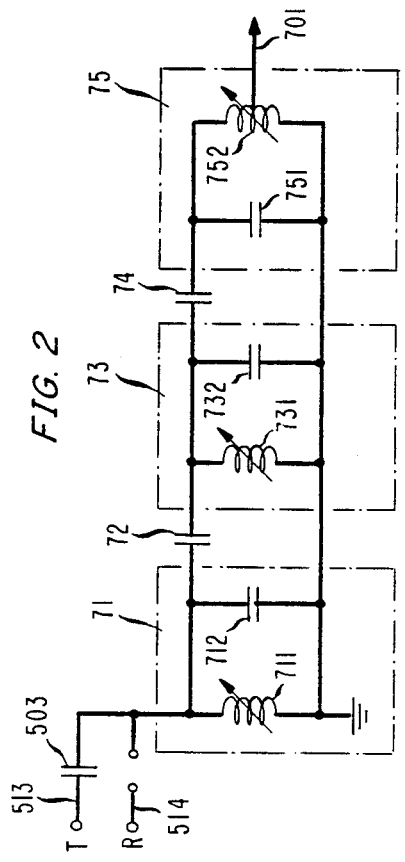
FIG. 2 is a schematic diagram showing the circuit components of the impedance matching and pre-selector filter network of the radio receiver for the antenna arrangement.

Now referring to FIG. 2, there is shown the components of the receiver's pre-selector filter and impedance matching network 70 which couples the RF signal from the tip line 513 to the radio receiver 58. The radio receiver's pre-selector filter and impedance matching network 70 consists of three distinct LC tank circuits, namely 71, 73, and 75. The first LC tank circuit 71 is resonant at the receiver frequency. Its main purpose is to pass the desired signal to the receiver while rejecting signals at the image frequency of the receiver as well as to reject all other frequencies. Capacitors 503 and 72 are chosen to produce a slightly over coupled condition so that the tuning of the inductors 711 and 731, of sections 71 and 73 respectively, is not difficult. The third LC section 75 provides a filtering function similar to that of 71 and 73. In addition, it also provides impedance transformation, via the tapped output of its variable inductor 752, to provide a matched condition to the radio receiver's RF input port via line 701.

Figure 3:
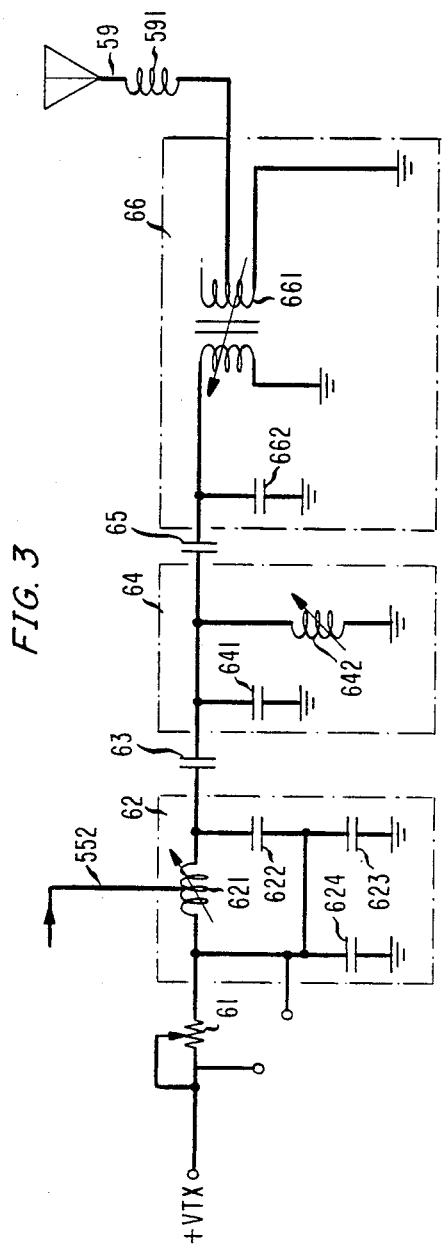
FIG. 3 is a schematic diagram showing the circuit components of the filtering and impedance matching network of the radio transmitter for the antenna arrangement.

In reference to FIG. 3, there is shown the transmitter's impedance matching and filtering network 60 which couples the signal from the radio transmitter's RF output over line 552 to transmitting antenna 59 via the loading coil 591. The transmitter's impedance matching and filtering network consists of three filtering sections, namely 62, 64, and 66.

The first filtering section 62 receives the RF signal from the radio transmitter 55 over line 552. In addition to being used for filtering of harmonics and spurious signals generated within the transmitter, the first filtering section 62 and the third filtering section 66 are also used for impedance matching. Filtering section 64 which consists of capacitor 641 and variable inductor 642 only serves as a filter. The first filtering section 62, which consists of variable inductor 621 and capacitors 622, 623, and 624, increases the impedance in the direction from line 552 to coupling capacitor 63. On the other hand, the third filtering section which consists of capacitor 662 and variable coil 661 decreases the impedance in the direction from coupling capacitor 65 to the fixed loading coil 591. The impedance matching capabilities of filtering sections 62 and 66 are analogous to those described in the receiver. $V_{tx}$ is a DC biasing voltage and resistor 61 is used as a rheostat. $V_{tx}$ in combination with the rheostat 61 provide a variable current source to the radio frequency transistor, within the transmitter, over line 552. The rheostat 61 controls the level of the transmitter's RF output signal.

Various other modifications of this invention are contemplated and may obviously be resorted to by those skilled in the art without departing from the spirit and scope of the invention as hereinafter defined by the appended claims.

I claim:

1. An antenna arrangement for use with a cordless telephone including a base unit and a handset unit, the base unit being connectable to a telephone line for communicating with a central office and for transmitting to and receiving radio frequency signals from a handset unit associated with the base unit, the handset unit also transmitting to and receiving radio frequency signals from the base unit, the antenna arrangement comprising:

a whip antenna operably connected to the base unit for providing a means for transmitting the radio frequency signals from the base unit for reception by the handset unit; and antenna means operable in conjunction with the base unit for receiving radio frequency signals, the antenna means comprising the telephone line for providing the communications between the base unit and the central office and for receiving the radio frequency signals transmitted from the handset unit for reception by the base unit.

2. An antenna arrangement for use with a cordless telephone including a base unit and a handset unit, the base unit being connectable to a telephone line for communicating with a central office and for transmitting to and receiving radio frequency signals from a handset unit associated with the base unit, the handset unit also transmitting to and receiving radio frequency signal from the base unit, the antenna arrangement comprising:

antenna means operable in conjunction with the base unit for receiving radio frequency signals, the antenna means comprising the telephone line for providing the communications between the base unit and the central office, the telephone line also including telephone house wiring operable for receiving the radio frequency signals transmitted from the handset unit for reception by the base unit; and antenna interface means for coupling the radio frequency signals from the antenna means to receiving means in the base unit, the antenna interface means comprising capacitance coupling means for connecting the telephone line to the receiving means.

3. The antenna arrangement of claim 2 wherein the receiving means comprises filtering means for tuning to and responding to a range of radio frequency signals transmitted by the handset unit.

* * * * *